US012368196B2

(12) United States Patent
Lee et al.

(10) Patent No.: US 12,368,196 B2
(45) Date of Patent: Jul. 22, 2025

(54) PHASE-CHANGE COOLING MODULE AND BATTERY PACK USING SAME

(71) Applicant: Korea Institute of Machinery & Materials, Daejeon (KR)

(72) Inventors: Jungho Lee, Daejeon (KR); Jin Sub Kim, Seoul (KR); Dong Hwan Shin, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 158 days.

(21) Appl. No.: 17/058,327

(22) PCT Filed: May 28, 2019

(86) PCT No.: PCT/KR2019/006352
§ 371 (c)(1),
(2) Date: Nov. 24, 2020

(87) PCT Pub. No.: WO2019/231202
PCT Pub. Date: Dec. 5, 2019

(65) Prior Publication Data
US 2021/0218090 A1    Jul. 15, 2021

(30) Foreign Application Priority Data
May 28, 2018    (KR) .......................... 10-2018-0060602

(51) Int. Cl.
*H01M 10/6569*    (2014.01)
*H01M 10/613*    (2014.01)
(Continued)

(52) U.S. Cl.
CPC ..... *H01M 10/6569* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS 7,461,640 B1 * 12/2008 Agee ........................ F01P 11/18
123/568.13
2002/0135981 A1 * 9/2002 Pautsch .............. H05K 7/20345
257/714
(Continued)

FOREIGN PATENT DOCUMENTS

| JP | 2015-069845 A | 4/2015 |
| JP | 2016-146298 A | 8/2016 |

(Continued)

OTHER PUBLICATIONS

Nemec, Patrik. "Porous structures in heat pipes." Porosity-Process, Technologies and Applications (2017). (Year: 2017).*
(Continued)

*Primary Examiner* — Helen Oi K Conley
*Assistant Examiner* — Amanda Rosenbaum
(74) *Attorney, Agent, or Firm* — Harness, Dickey & Pierce, P.L.C.

(57) ABSTRACT

In a phase-change cooling module and a battery pack using the phase-change cooling module, the phase-change cooling module includes a body, a porous layer and a cooling medium. The body has a cooling channel formed through an inside of the body along a predetermined passage, and is attached to an cooling object to transfer a heat from the cooling object to the cooling channel. The porous layer is formed on a side wall of the cooling channel with a predetermined thickness, and has a plurality of pores at a surface of the porous layer. The cooling medium makes contact with the porous layer and flows an inside of the cooling channel, to absorb the heat from the cooling object.

(Continued)

The cooling medium uses the heat from the cooling object as a potential heat for a boiling.

5 Claims, 7 Drawing Sheets

(51) Int. Cl.
*H01M 10/625* (2014.01)
*H01M 10/6552* (2014.01)
*H01M 10/6556* (2014.01)
*H01M 50/204* (2021.01)

(52) U.S. Cl.
CPC ............... *H01M 10/6552* (2015.04); *H01M 10/6556* (2015.04); *H01M 50/204* (2021.01)

(56) References Cited

U.S. PATENT DOCUMENTS

| | | | | |
|---|---|---|---|---|
| 2013/0255293 | A1* | 10/2013 | Gadawski | H01M 10/6555 429/62 |
| 2014/0342195 | A1* | 11/2014 | Bhola | H01M 10/613 429/50 |
| 2015/0236386 | A1* | 8/2015 | Yang | H01M 10/658 165/104.21 |
| 2017/0105313 | A1* | 4/2017 | Shedd | H05K 7/20309 |
| 2018/0034116 | A1* | 2/2018 | Tajima | H01M 10/6551 |
| 2018/0145382 | A1* | 5/2018 | Harris | H01M 10/613 |

FOREIGN PATENT DOCUMENTS

| | | |
|---|---|---|
| KR | 10-2001-0030251 A | 4/2001 |
| KR | 100610293 B1 | 8/2006 |
| KR | 100803198 B1 | 2/2008 |
| KR | 10-2009-0089699 A | 8/2009 |
| KR | 10-2014-0084247 A | 7/2014 |
| KR | 10-2016-0148938 A | 12/2016 |
| KR | 10-2017-0092982 A | 8/2017 |

OTHER PUBLICATIONS

International Search Report PCT/ISA/210 for International Application No. PCT/KR2019/006352 dated Sep. 3, 2019.

* cited by examiner

PHASE-CHANGE COOLING MODULE AND BATTERY PACK USING SAME

CROSS-REFERENCE TO RELATED APPLICATIONS

This application is a national phase under 35 U.S.C. § 371 of PCT International Application No. PCT/KR2019/006352 which has an International filing date of May 28, 2019, which claims priority to Korean Application No. 10-2018-0060602, filed May 28, 2018, the entire contents of each of which are hereby incorporated by reference.

BACKGROUND

1. Field of Disclosure

The present disclosure of invention relates to a phase-change cooling module and a battery pack using the phase-change cooling module, and more specifically the present disclosure of invention relates to a phase-change cooling module and a battery pack using the phase-change cooling module, capable of cooling a cooling object uniformly, using a potential heat of a cooling medium.

2. Description of Related Technology

Generally, a heat is generated when devices like a semiconductor in a various kinds of electric devices, or a battery pack in an electric vehicle is used. The generated heat should be cooled or dissipated with a proper cooling system, and if not, performance of the devices and the battery pack must be decreased or the devices and the battery pack may be damaged due to an overheating.

As for the cooling system for cooling or dissipating the devices or the battery pack, which may be called as a cooling object, a cooler is normally equipped. An operating system for the cooler may be divided into two types mentioned below.

First, the cooler may be operated by an air cooling system in which an air is driven to be circulated on a surface of the cooling object. Second, the cooler may be operated by a water cooling system in which a liquid as a cooling medium is driven to flow on the surface of the cooling object.

In the air cooling system, the cost price for equipping the system is relatively cheap but an efficiency of cooling is relatively low, a vice versa in the water cooling system. Thus, the water cooling system is applied for the cooling object requiring for relatively higher cooling efficiency.

A cooling jacket is an example for the water cooling system. In the conventional cooling jacket, a cooling passage is curved and the cooling medium absorbs the heat from the cooling object, via flowing the cooling passage. In the cooling jacket, a length of the cooling passage is maximized, so that a contact area between the cooling medium and an inner surface of the cooling jacket is increased. Thus, the heat from the cooling object may be more effectively transferred to the cooling medium.

However, in the conventional cooling jacket, as the cooling medium absorbs the heat, a temperature of the cooling medium is increased while the cooling medium flows in the cooling passage. Thus, a temperature difference between the cooling jacket and the cooling object at an inlet of the cooling passage is different from that at an outlet of the cooling passage.

Accordingly, in the conventional cooling jacket, the cooling object may be cooled un-uniformly.

In addition, in the conventional cooling jacket, a phase state of the cooling medium is maintained in the cooling system, and thus an amount of the cooling medium should be increased to enhance the efficiency of the heat transfer. Here, the efficiency of the heat transfer using the cooling medium without a change of the phase state (single phase) is less than that using the cooling medium with a phase change (two phases) by about $\frac{1}{10}$ to $\frac{1}{5}$.

Accordingly, to increase the heat flux which means the heat transfer by a unit area or by a unit period, the amount of the cooling medium should be increased, so that the cooling system may be increased or relatively large-sized.

Related prior arts are Korean patent No. 10-0610293 (Liquid cooling jacket, 2006.08.09).

SUMMARY

The present invention is developed to solve the above-mentioned problems of the related arts. The present invention provides a phase-change cooling module and a battery pack using the phase-change cooling module, capable of cooling a cooling object uniformly and having an increased heat flux.

According to an example embodiment, the phase-change cooling module includes a body, a porous layer and a cooling medium. The body has a cooling channel formed through an inside of the body along a predetermined passage, and is attached to an cooling object to transfer a heat from the cooling object to the cooling channel. The porous layer is formed on a side wall of the cooling channel with a predetermined thickness, and has a plurality of pores at a surface of the porous layer. The cooling medium makes contact with the porous layer and flows an inside of the cooling channel, to absorb the heat from the cooling object. The cooling medium uses the heat from the cooling object as a potential heat for a boiling.

In an example, the cooling channel may include a first section in which the cooling medium flows with a first pressure and a second section in which the cooling medium flows with a second pressure lower than the first pressure. A cross-sectional area of the second section may be larger than that of the first section.

In an example, the body may include an attaching area in which the cooling object is attached and a non-attaching area in which the cooling object is not attached. The phase-change cooling module may further include an over cooling channel formed along the non-attaching area and connected with the cooling channel. The cooling medium is flowed into the over cooling channel.

In an example, the cooling medium may be provided to an inlet of the over cooling channel with a temperature less than a boiling point of the cooling medium, and the temperature the cooling medium may be increased to the boiling point of the cooling medium as the cooling medium absorbs the heat from the body by flowing inside the cooling channel.

In an example, the cooling medium may have a critical point at which the heat flux is increased to be decreased, according to a thickness of the porous layer or a size of each of the pores. The porous layer may be formed such that the thickness of the porous layer or the size of the pore corresponds to the critical point.

In an example, the cooling channel may include an inlet into which the cooling medium is flowed, and an outlet into which the cooling medium is exhausted. The phase-change cooling module may further include a providing line, an inlet line and a heat transfer area. The providing line may be connected to the inlet of the cooling channel and provide the cooling medium to the cooling channel. The inlet line may be connected to the outlet of the cooling channel and receive the cooling medium exhausted from the cooling channel. The cooling medium may be provided by the providing line and the cooling medium received by the inlet line being heat-transferred with each other in the heat transfer area.

According to another example embodiment, a battery pack has the phase-change cooling module. The phase-change cooling module includes a body, a porous layer and a cooling medium. The body has a cooling channel formed through an inside of the body along a predetermined passage, and is attached to an cooling object to transfer a heat from the cooling object to the cooling channel. The porous layer is formed on a side wall of the cooling channel with a predetermined thickness, and has a plurality of pores at a surface of the porous layer. The cooling medium makes contact with the porous layer and flows an inside of the cooling channel, to absorb the heat from the cooling object. The cooling medium uses the heat from the cooling object as a potential heat for a boiling.

According to the present example embodiments, the heat from the cooling object is used as a potential heat for the phase change of the cooling medium, and thus the cooling object may be cooled uniformly.

In addition, the cooling medium may be boiled fast by the porous layer, and the bubble may be generated more, so that the cooling efficiency may be increased.

In addition, the bubble generated by the boiling of the cooling medium may enhance the cooling efficiency.

In addition, the thickness of the porous layer or the size of the pore is changed, so that the cooling efficiency due to the boiling may be maximized.

In addition, relatively larger heat may be absorbed with the same cooling medium, and thus the cooling module may be minimized or more lighter, so that the driving efficiency for the whole cooling system may be enhanced.

In addition, the pressure of the cooling medium flowing in the cooling channel is uniformly maintained, so that the cooling object may be uniformly cooled.

In addition, the cooling medium is pre-heated using the over cooling channel, or the cooling medium with the over cooling state is pre-heated using the heat transfer part, so that the cooling object may be uniformly cooled without an additional equipment.

REFERENCE NUMERALS

100: body 110: cooling channel
200: porous layer 300: cooling medium
H: cooling object B: bubble

DETAILED DESCRIPTION

The invention is described more fully hereinafter with reference to the accompanying drawings, in which embodiments of the invention are shown.

Figure 1:
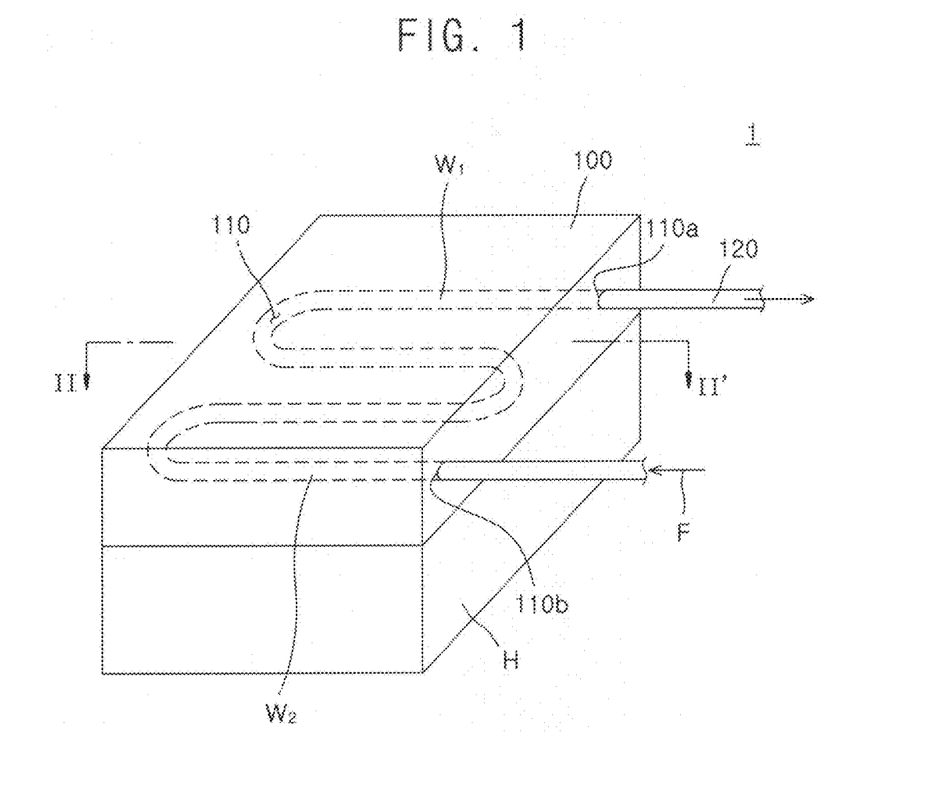
FIG. 1 is a perspective view illustrating a phase-change cooling module according to a first example embodiment of the present invention.
Figure 2:
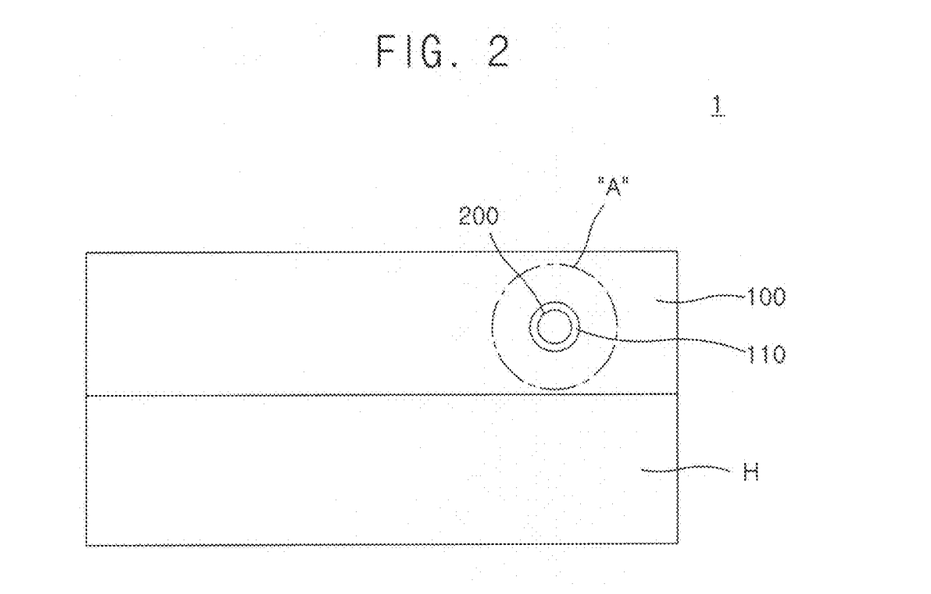
FIG. 2 is a cross-sectional view along a line II-II' of FIG. 1.
Figure 3:
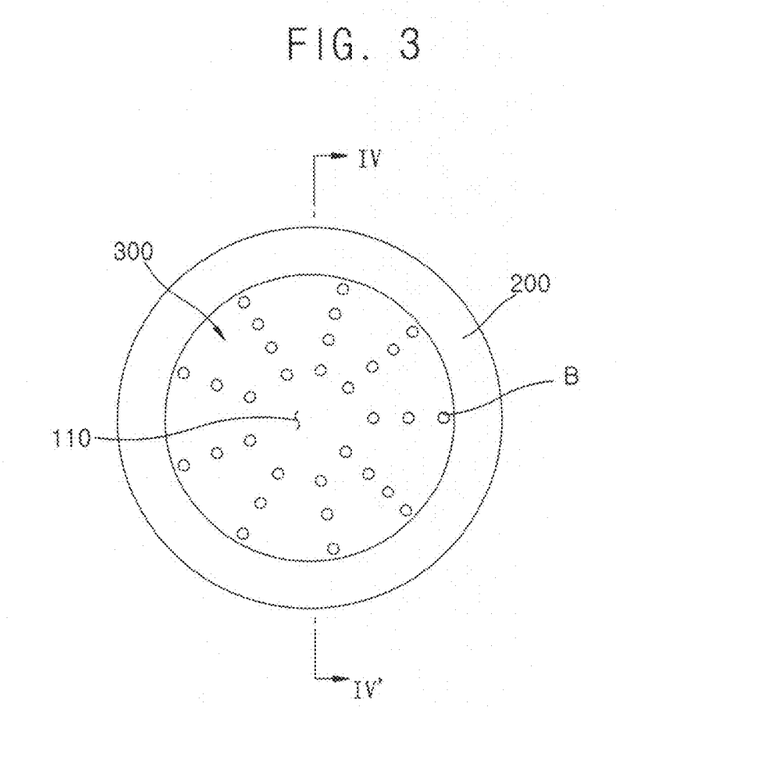
FIG. 3 is an enlarged view of a portion "A" of FIG. 2.
Figure 4:
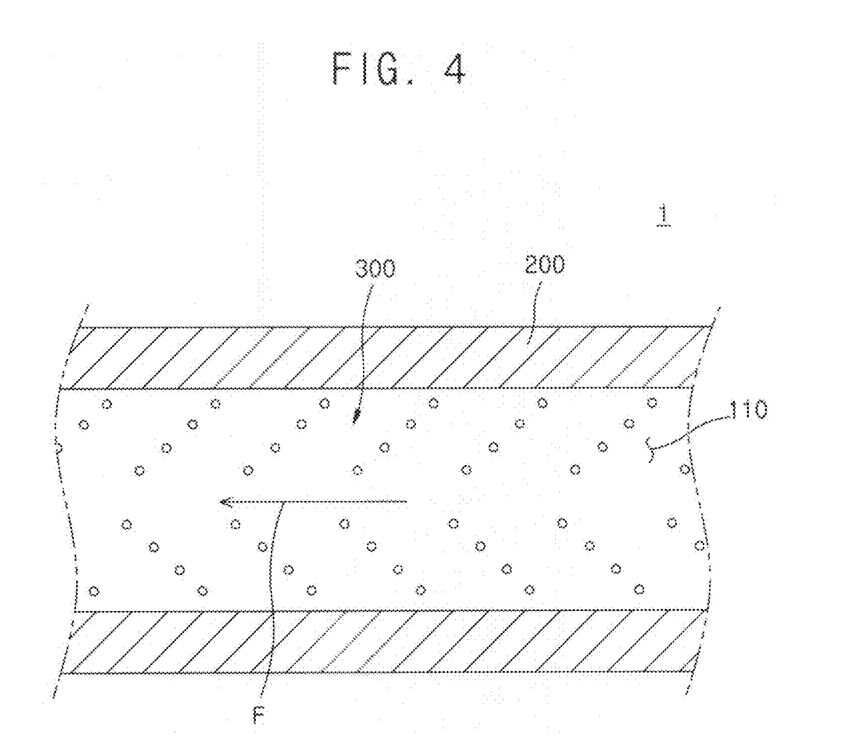
FIG. 4 is a cross-sectional view along a line IV-IV' of FIG. 3.
Figure 5:
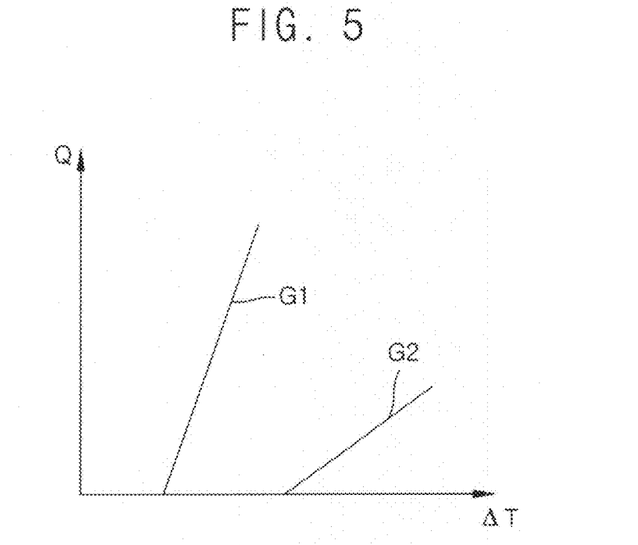
FIG. 5 is a graph showing a difference of a heat flux with or without a porous layer.
Figure 6:
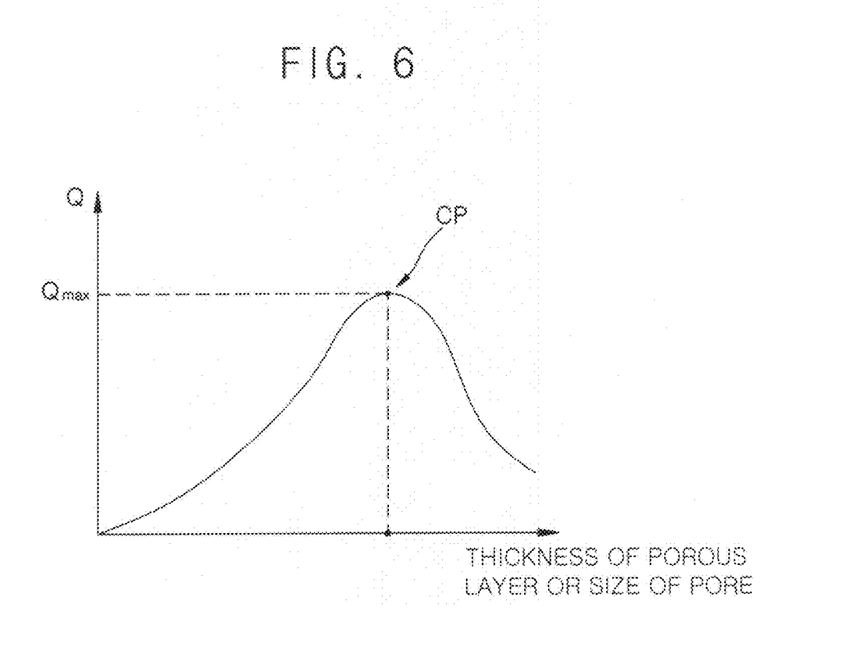
FIG. 6 is a graph showing a change of the heat flux according to a thickness of the porous layer or a size of a pore formed in the phase-change cooling module of FIG. 1.

FIG. 1 is a perspective view illustrating a phase-change cooling module according to a first example embodiment of the present invention, FIG. 2 is a cross-sectional view along a line II-II' of FIG. 1, FIG. 3 is an enlarged view of a portion "A" of FIG. 2, FIG. 4 is a cross-sectional view along a line IV-IV' of FIG. 3, FIG. 5 is a graph showing a difference of a heat flux with or without a porous layer, FIG. 6 is a graph showing a change of the heat flux according to a thickness of the porous layer or a size of a pore formed in the phase-change cooling module of FIG. 1.

Referring to FIGS. 1 to 6, the phase-change cooling module 1 according to the present example embodiment uses a potential heat of a cooling medium 300 to cool a cooling object H uniformly, and includes a body 100, a porous layer 200 and a cooling medium 300.

Referring to FIG. 1, the body 100 includes a cooling channel 110. The cooling channel 110 is formed inside of the body 100 along a predetermined passage. The body 100 is attached to the cooling object H (which is an object to be cooled), and transfers the heat of the cooling object H to the cooling channel 110. The body 100 may include a material like stainless steel, ceramics, tungsten, and so on, with a high durability and a high thermal conductivity.

A side surface of the body 100 makes contact with the cooling object H to receive the heat, or may be formed or equipped to receive the heat from the cooling object H. Here, the cooling object H may be a heat generating object like a CPU or a graphic chipset of a personal computer, a battery pack having a plurality of battery cells equipped to an electric vehicle, and so on.

The cooling channel 110 includes an inlet 110a into which the cooling medium 300 flows, and an outlet 110b through which the cooling medium 300 is exhausted. The cooling channel 1100 may be connected to a receiving space (not shown) in which the cooling medium 300 is received, with a connecting member 120 like a tube. A flow control valve (not shown) capable of controlling the flow or the amount of the cooling medium may be equipped to the connecting member 120.

Referring to FIGS. 2 to 4, the porous layer 200 is formed at a side wall of the cooling channel 110, with a uniform thickness, and has a plurality of pores (not shown) formed on a surface of the porous layer 200. Here, the porous layer 200 may be formed via a various kinds of methods. For example, a soldering or a brazing in which metal particles having a predetermined fineness number are melted to be attached to the side wall of the cooling channel 110, may be used. Alternatively, a sintering in which the metal particles are heated and a surface of the metal particle is melted to be attached to the side wall of the cooling channel 110, may be used.

A shape of each of the pores may be a concavo-convex shape in which protrusions are repeatedly formed on a surface of the pore, or a lot of porous particles having a fine size are formed on the surface of the pore or formed inside of the pore to form the pore, like basalt.

Referring to FIG. 3, the cooling medium 300 flows inside of the cooling channel 110, with making contact with the porous layer 200, to absorb the heat from the cooling object H. The heat absorbed by the cooling medium 300 is used as the potential heat necessary for the boiling of the cooling medium 300.

The boiling is the generating of a bubble B at a boundary surface when the cooling medium 300 makes contact with the surface having the temperature over a saturation temperature of the cooling medium 300. For the boiling, the heat on the surface of the porous layer is used as the potential heat for generating the bubble, and the generating the bubble means a change of a phase of the cooling medium 300.

As illustrated in FIGS. 3 and 4, as the bubble B is detached from the surface of the porous layer 200, the bubble B flows along the cooling channel 110. In other words, as a phase of the cooling medium 300 is changed from a liquid to a vapor, the heat generated from the cooling object H is transferred to cooling medium 300 which flows along the cooling channel 110. Thus, dryness of the cooling medium 300, or a vapor content ratio in the cooling medium 300 is increased, as the cooling medium 300 flows from the inlet 110a of the cooling channel 110 to the outlet 110b of the cooling channel 110.

Accordingly, as the cooling medium 300 flows along the cooling channel 110, the liquid state cooling medium 300 is changed into a vapor state, and during the phase change, the temperature of the cooling medium 300 is maintained almost uniformly and the cooling object H is cooled down. Thus, in the present example embodiment, as illustrated in FIG. 1, the temperature of the cooling channel 110 at a first point W1 is substantially same as that at a second point W2, so that the cooling object H may be uniformly cooled down.

Conventionally, the heat transferred from the cooling object H to the cooling module, is used as a sensible heat which increases the temperature of the cooling medium 300. Thus, the temperature of the cooling module is different from the cooling object H at every section of the cooling module, so that the cooling object H may be hard to be uniformly cooled down.

For example, the chipset like a CPU or a GPU, or the battery pack in the electric vehicle should be cooled uniformly, and if any portions thereof are not cooled and the temperature of any portions is increased to a critical temperature, the driving of the devices may be hard to be stabilized and further the devices may be damaged due to the heat.

The cooling medium 300 may be called as a phase change material. As for the cooling medium 300, a temperature of a saturation point at which the phase is changed should be relatively lower, a specific volume should be relatively smaller so that the heat may be more absorbed with the same mass. The cooling medium 300 may be a phase change material like n-paraffinic, general organic matter, inorganic matter and so on, and may be selected considering a required saturation point and a required specific heat. For example, the cooling medium 300 may be a water, Freon gas, a perfluoro carbon liquid, and so on.

The cooling medium 300 rapidly enters into a boiling condition, due to the pores formed in the porous layer 200. Even though the cooling medium 300 flowing in the cooling channel 110 is in sub-cooled condition in which the temperature of the cooling medium 300 is lower than the saturation point of the cooling medium 300, the pore formed in the porous layer 200 functions as an active point, so that the generation of the bubble B may be accelerated at the active point.

For example, since the amount of the active points is relatively less, the water is hard to be boiled on the glass. However, in the present example embodiment, the active points are formed numerously in the porous layer 200, so that the cooling medium 300 flowed in the cooling channel 110 may be boiled much faster and the bubble B may be generated more.

As illustrated in FIG. 5, in the increasing of the heat flux Q of the cooling medium 300 according to the temperature difference between the cooling object H and the cooling medium 300, the boiling is generated at a relatively lower temperature difference T with the porous layer 200 (G1), compared to without the porous layer 200 (G2). Thus, the cooling may be started more quickly, and the increasing rate of the heat flux Q according to the temperature difference T may be relatively higher.

Accordingly, as in the present example embodiment, since the porous layer 200 is formed, the cooling due to the boiling is started more quickly, and thus the cooling object H may be maintained with a relatively lower temperature and the increasing rate of the heat flux Q may be relatively higher. Thus, the cooling efficiency may be increased.

In addition, due to the porous layer 200 formed on the side wall of the cooling channel 110, the pressure drop of the cooling medium 300 flowing in the cooling channel 110 may be decreased more.

In a plain channel in which the porous layer 200 is not formed, the size of the bubble is increased so that the cooling medium 300 advances along a longitudinal direction of the cooling channel. Thus, the bubble is condensed to be from a bubbly flow to a plug flow and further to be an annular flow. The above plug flow or the annular flow may cause the drop of the pressure rapidly. However, in a cooling channel 110 in which the porous layer 200 is formed, the size of the bubble is relatively decreased, and thus the bubble is hard to be condensed. Thus, the bubble has the bubbly flow to the end without forming the plug flow, so that the drop of the pressure is prevented or is to be decreased.

Referring to FIG. 6, the boiling accelerated by the porous layer 200 has a critical point CP before which, the heat flux is increases according to the thickness of the porous layer 200 or the size of the pore and after which, the heat flux decreases according to the thickness of the porous layer 200 or the size of the pore. For example, as the thickness of the porous layer 200 is increased or the size of the pore is increased, the heat flux Q is gradually increased to be the maximum heat flux Qmax, and then the heat flux Q is decreased after the thickness of the porous layer or the size of the pore reaches a predetermined value.

Here, when the size of the pore is too small, the bubble B is hard to be grown and merely stays inside of the pore. In contrast, when the size of the pore is too large, the liquid state cooling medium 300 is penetrated into the bubble B to remove or eliminate the bubble B. Likewise, when the thickness of the porous layer 200 is too thin, the number of the pores is not enough to accelerate the boiling. In contrast, when the thickness of the porous layer 200 is too thick, the number of the pores is enough to accelerate the boiling, but the porous layer 200 may be a resistant layer to block the heat transfer between the cooling object H and the cooling medium 300.

Accordingly, to maximize the cooling efficiency due to the boiling, the thickness of the porous layer 200 or the size of the pore is properly formed to correspond to the critical point CP and to solve the above-mentioned problem.

In addition, when the bubble B flows in the cooling channel 110, the bubble B is mixed or scattered by itself, to mix the cooling medium 300 just like mixing water with a bar or a stick. Thus, the heat flux Q may be increased more, compared to the convection of the cooling medium 300 due to the difference of the temperature. Accordingly, the cooling efficiency, an amount of the cooling by a unit period, may be increased.

In addition, the specific heat during the boiling of the cooling medium 300 is larger than that during the temperature increasing of the cooling medium 300 by about 5 to 10 times. Thus, in the present example embodiment, relatively larger heat may be absorbed with the same amount of the cooling medium 300, so that relatively small amount of the cooling medium 300 may be circulated to obtain the same cooling efficiency. Accordingly, the size the cooling module may be decreased and the weight thereof may also be decreased. In addition, since the circulated amount of the cooling medium 300 is decreased, the whole cooling system having the pump may be driven more efficiently.

Hereinafter, a phase-change cooling module 2 according to a second example embodiment of the present invention is explained, and the same elements of the present example embodiment are used as the same reference numerals of the previous example embodiment.

Figure 7A:
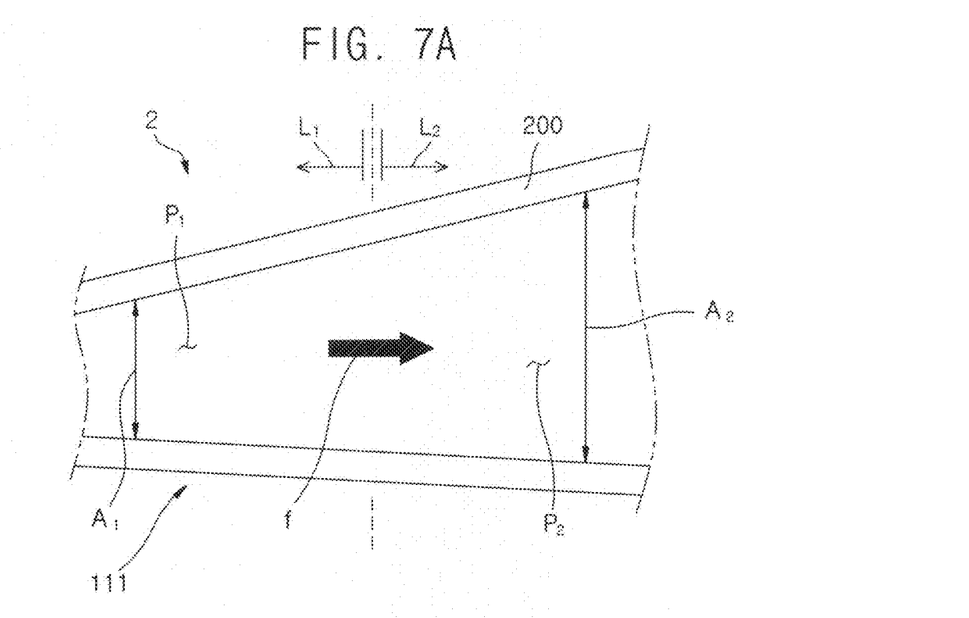
FIGS. 7A and 7B are schematic views illustrating a cooling channel of a phase-change cooling module according to a second example embodiment of the present invention.
Figure 7B:
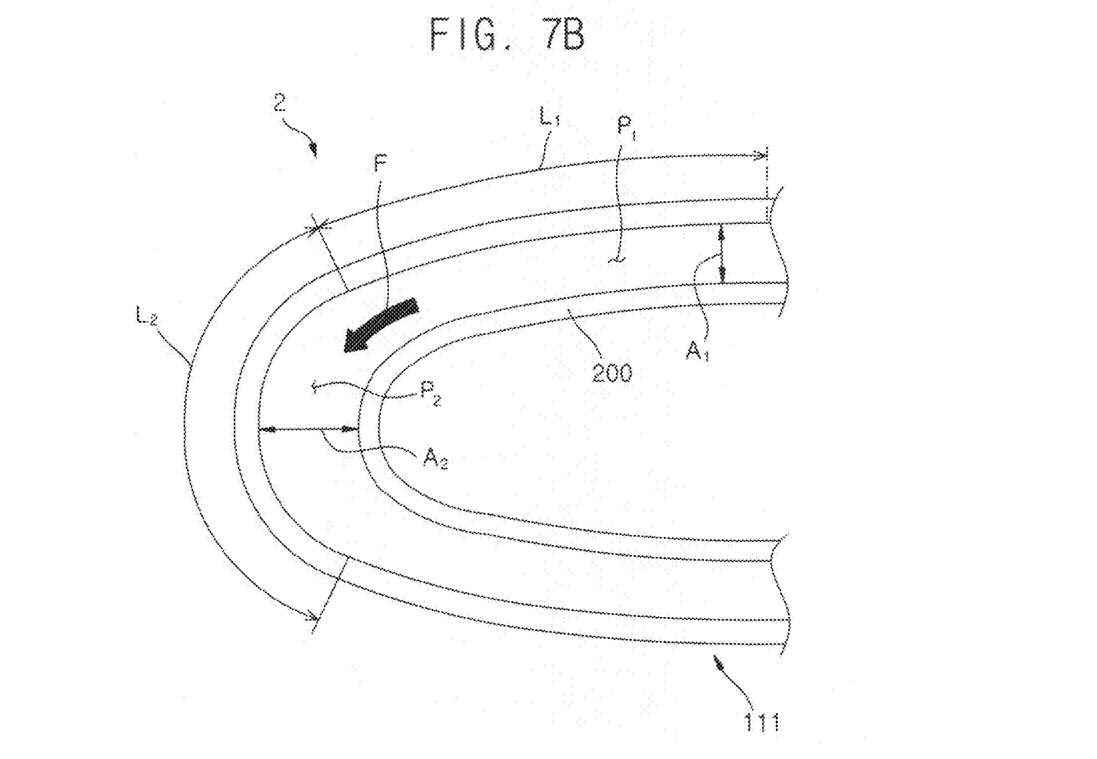

FIGS. 7A and 7B are schematic views illustrating a cooling channel of a phase-change cooling module according to a second example embodiment of the present invention.

As illustrated in FIG. 7A, in the cooling module 2 of the present example embodiment, the cooling channel 111 has a first section L1 in which the cooling medium 300 flows with a first pressure P1 and a second section L2 in which the cooling medium 300 flows with a second pressure P2. Here, a cross-sectional area A2 of the second section L2 is larger than a cross-sectional area A1 of the first section L1.

Referring to FIG. 7A, while the cooling medium 300 flows from the first section L1 of the cooling channel 111 to the second section L2 thereof, the cooling medium 300 is rubbed with the side wall of the cooling channel 111 and the pressure of the cooling medium 300 is gradually decreased, so that the pressure P2 of the second section becomes less than the pressure P1 of the first section. In addition, referring to FIG. 7B, while the cooling medium 300 flows from the first section L1 having a linear shape of the cooling channel 111 to the second section L2 having a curved shape thereof, the pressure of the cooling medium 300 is gradually decreased in a proportion to the curvature of the curved shape of the second section L2, so that the pressure P2 of the second section becomes less than the pressure P1 of the first section.

Accordingly, when the pressure is different according to the sections, the boiling of the cooling medium 300 is changed according to the difference of the pressure of the cooling medium 300. Thus, the heat flux Q is also changed, and the cooling medium 300 is cooled down un-uniformly according to the cooling channel 111. Accordingly, the cross-sectional area A2 of the second section is larger than the cross-sectional area A1 of the first section, to make the pressure of the first section L1 substantially same as that of the second section L2.

Hereinafter, a phase-change cooling module 3 according to a third example embodiment of the present invention is explained, and the same elements of the present example embodiment are used as the same reference numerals of the previous example embodiments.

Figure 8:
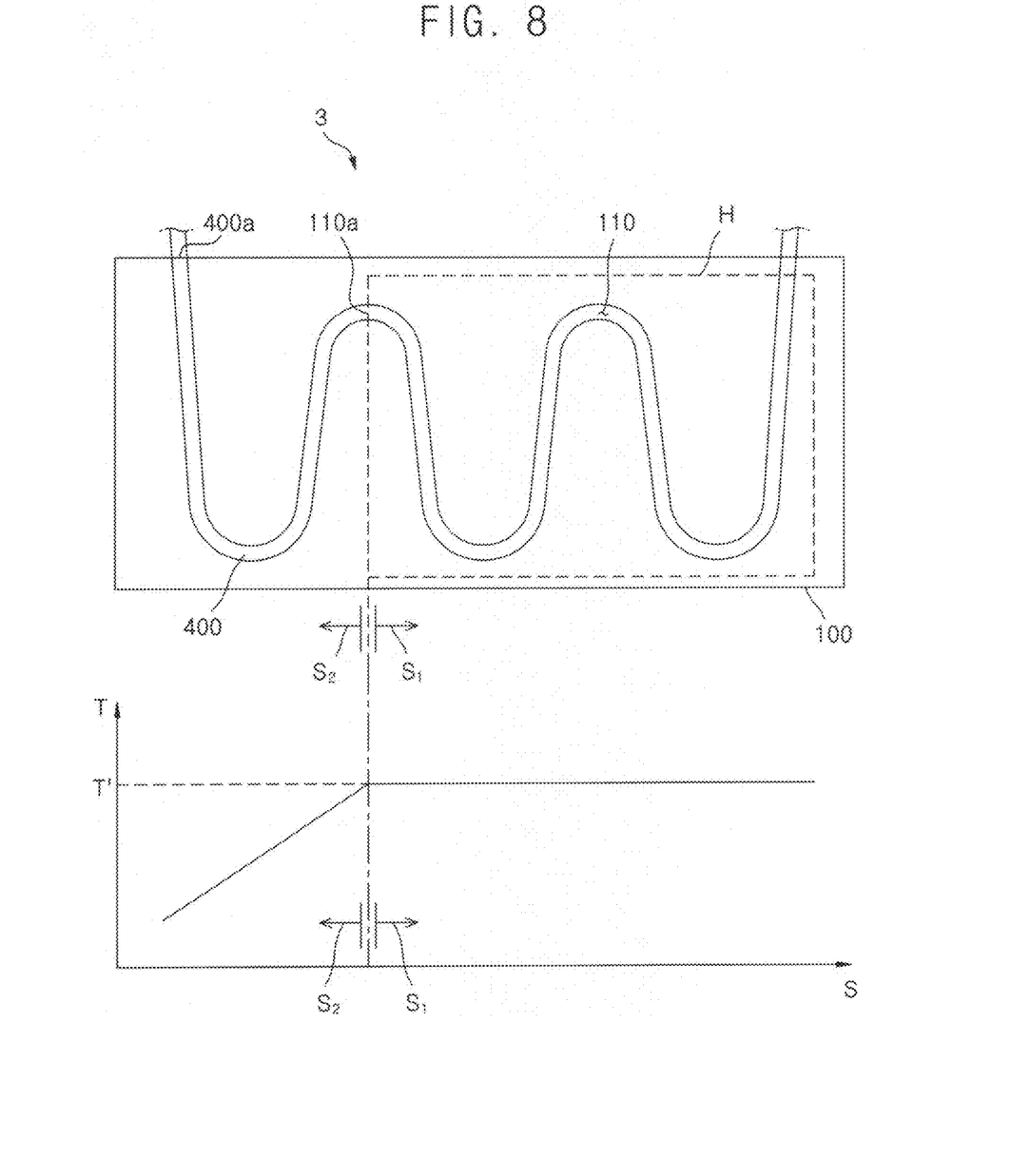
FIG. 8 is a schematic view explaining a function of an over cooling channel of a phase-change cooling module according to a third example embodiment of the present invention.

FIG. 8 is a schematic view explaining a function of an over cooling channel of a phase-change cooling module according to a third example embodiment of the present invention.

Referring to FIG. 8, the body 100 includes an attaching area S1 in which the cooling object H is attached, and a non-attaching area S2 in which the cooling object H is not attached. The body 100 further includes an over cooling channel 400. The over cooling channel 400 is formed along the non-attaching area S2 so that the cooling medium 300 is flowed into the over cooling channel 400, and the over cooling channel 400 is connected to the cooling channel 110.

The cooling medium 300 is provided to an inlet 400a of the over cooling channel 400 with a temperature less than the boiling point of the cooling medium 300, and as the cooling medium 300 flows inside of the cooling channel 110, the cooling medium 300 absorbs the heat from the body 100 so that the temperature of the cooling medium 300 is increased to be a boiling point T'.

For example, perfluoro carbon liquid which is an example of the cooling medium 300 has the boiling point T' of 56° C. at the atmospheric pressure, and as the inner pressure of the cooling channel 110 is decreased, the boiling point T' thereof is decreased. Thus, if the temperature of perfluro carbon liquid is not increased to be close to the boiling point T' in advance, the heat from the cooling object H to the body 100 is used as a sensible heat which increases the temperature of the cooling medium 300, in a predetermined section from the inlet 110a of the cooling channel 110. Thus, the bubble B is hard to be generated at a portion of the cooling channel 110 close to the inlet 110a of the cooling channel 110, so that the cooling efficiency may be decreased. Accordingly, the cooling object H is hard to be cooled down uniformly.

To prevent the above mentioned problem, in the present example embodiment, the cooling medium 300 is pre-heated close to the boiling point T' using the over cooling channel 400, so that the boiling is actively generated from the inlet 100a of the cooling channel 110. Thus, the cooling object H may be cooled down uniformly, and additional elements such as a heating device heating the cooling medium 300, a vacuum device decreasing the boiling point T' and so on, are not necessary.

Here, the boiling point T' is a saturation temperature at an arbitrary pressure.

Hereinafter, a phase-change cooling module 4 according to a fourth example embodiment of the present invention is explained, and the same elements of the present example embodiment are used as the same reference numerals of the previous example embodiments.

Figure 9:
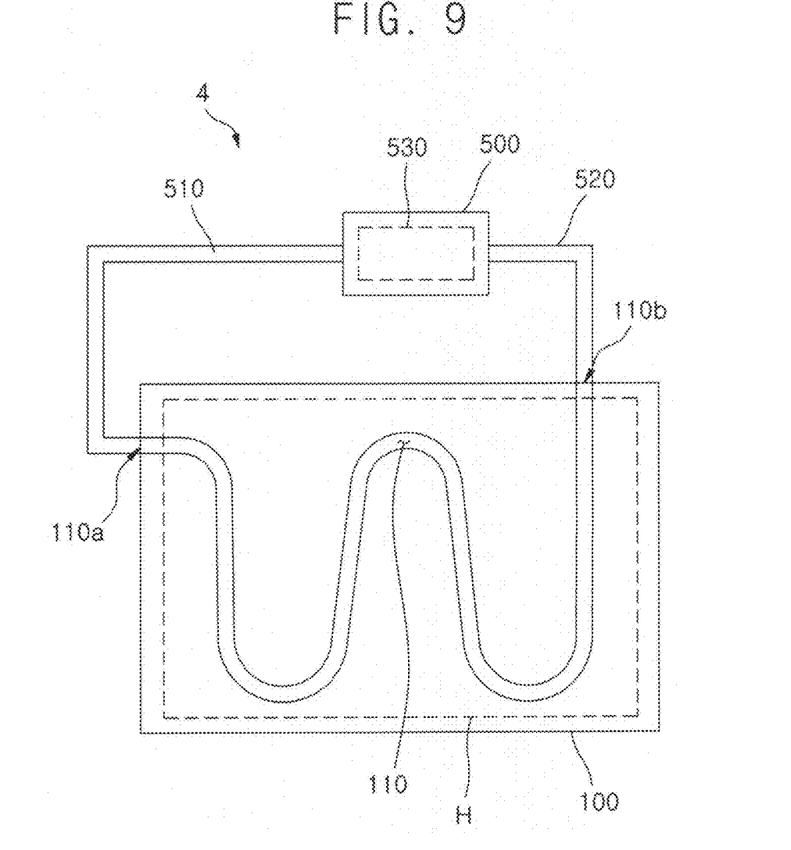
FIG. 9 is a schematic view illustrating a phase-change cooling module according to a fourth example embodiment of the present invention.

FIG. 9 is a schematic view illustrating a phase-change cooling module according to a fourth example embodiment of the present invention.

Referring to FIG. 9, the phase-change cooling module 4 according to the present example embodiment further includes a heat transfer part 500.

The heat transfer part 500 includes a providing line 510, an inlet line 520 and a heat transfer area 530. The providing line 510 is connected to the inlet 110a of the cooling channel 110 and provides the cooling medium 300 to the cooling channel 110. The inlet line 520 is connected to the outlet 110b of the cooling channel 110 and receives the cooling medium 300 exhausted from the cooling channel 110. The cooling medium 300 provided by the providing line 510 and the cooling medium 300 received by the inlet line 520 are heat-transferred with each other in the heat transfer area 530.

When the cooling medium provided to the cooling channel 110 is in a sub-cooling state in which the temperature of the cooling medium is less than the boiling point, as mentioned in the third example embodiment, the cooling object H may be cooled down un-uniformly.

To solve the above problem, in the present example embodiment, the cooling medium which is exhausted from the outlet 110b of the cooling channel 110 and is in a saturation state having the temperature close to the boiling point (or an over-heating state having the temperature larger than the boiling point), is heat-transferred with the cooling medium in the sub-cooling state, so that the cooling medium 300 provided to the cooling channel 110 is pre-heated so that the temperature of the cooling medium 300 is close to the boiling point T' (referring to FIG. 8).

Accordingly, the cooling medium is pre-heated to be close to the boiling point, and thus the cooling object H may be uniformly cooled down without any additional devices.

In the present example embodiment, the heat-transfer may be performed with various kinds of methods. For example, the high temperature medium from the inlet line 520 may be mixed with the low temperature medium in a receiving space (not shown) and thus the heat may be transferred with each other through convection or conduction. A heat-transferring wall may be disposed between the above two mediums and thus the heat may be transferred with each other through the heat-transferring wall. The two mediums may be alternatively provided to the receiving space, so that the sensible heat from the high temperature medium may heat the low temperature medium.

According to the present example embodiments, the heat from the cooling object is used as a potential heat for the phase change of the cooling medium, and thus the cooling object may be cooled uniformly.

In addition, the cooling medium may be boiled fast by the porous layer, and the bubble may be generated more, so that the cooling efficiency may be increased.

In addition, the bubble generated by the boiling of the cooling medium may enhance the cooling efficiency.

In addition, the thickness of the porous layer or the size of the pore is changed, so that the cooling efficiency due to the boiling may be maximized.

In addition, relatively larger heat may be absorbed with the same cooling medium, and thus the cooling module may be minimized or more lighter, so that the driving efficiency for the whole cooling system may be enhanced.

In addition, the pressure of the cooling medium flowing in the cooling channel is uniformly maintained, so that the cooling object may be uniformly cooled.

In addition, the cooling medium is pre-heated using the over cooling channel, or the cooling medium with the over cooling state is pre-heated using the heat transfer part, so that the cooling object may be uniformly cooled without an additional equipment.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A phase-change cooling module comprising: a body including a cooling channel, the cooling channel defined inside the body along a passage winding through the body and having an inlet and an outlet, the body completely surrounding all outer surfaces of the cooling channel, the body configured to be attached to a cooling object to transfer a heat from the cooling object to the cooling channel, the cooling object being a central processing unit (CPU), a graphic chipset, or a battery pack;

a porous layer on a side wall of the cooling channel; and a cooling medium making contact with the porous layer and flowing inside of the cooling channel, to absorb the heat from the cooling object, wherein a side surface of the body is parallel to a surface defined by the cooling channel and is configured to be attached to the cooling object such that the side surface of the body is in direct contact with an entirety of a side surface of the cooling object for cooling, wherein the cooling channel is configured to be directly connected to respective connecting members outside the body through the inlet and the outlet, wherein the body includes at least one of stainless steel, ceramics, or tungsten, wherein the cooling medium is received through the inlet, and the cooling medium is exhausted through the outlet, wherein the phase-change cooling module further comprises a heat transfer area, and the connecting members include a providing line and an inlet line, the providing line being connected to the inlet of the cooling channel and configured to provide the cooling medium to the cooling channel, the inlet line being connected to the outlet of the cooling channel and configured to receive the cooling medium exhausted from the cooling channel, and wherein the heat transfer area is configured to transfer heat from the cooling medium received by the inlet line to the cooling medium provided by the providing line, and thus the cooling medium provided to the cooling channel is pre-heated so that when heat is transferred from the cooling object to the cooling medium, a temperature of the cooling medium reaches a boiling point.

2. The phase-change cooling module of claim 1, wherein the cooling channel comprises a first section having a first cross-section area and a second section having a second cross-section area larger than the first cross-section area.

3. The phase-change cooling module of claim 1, wherein the body comprises an attaching area in which the cooling object is attached and a non-attaching area in which the cooling object is not attached, and the phase-change cooling module further comprises an over cooling channel along the non-attaching area and connected with the cooling channel, and configured to flow the cooling medium therethrough.

4. The phase-change cooling module of claim 3, wherein the over cooling channel is configured to receive the cooling medium with the temperature less than the boiling point of the cooling medium through an inlet thereof, and the cooling channel is configured to increase the temperature of the cooling medium to the boiling point of the cooling medium as the cooling medium absorbs the heat from the body while flowing inside the cooling channel.

5. The phase-change cooling module of claim 1, wherein the cooling object is the battery pack.

* * * * *